April 7, 1953  J. HESS  2,634,087

BALANCED ROTARY VALVE ASSEMBLY

Filed Feb. 7, 1947

Inventor
Jack Hess
E. V. Hardway
Attorney

Patented Apr. 7, 1953

2,634,087

UNITED STATES PATENT OFFICE 2,634,087

BALANCED ROTARY VALVE ASSEMBLY

Jack Hess, Houston, Tex., assignor of fifty per cent to Salvatore Velotta, Harris County, and thirty-seven and one-half per cent to I. S. Warner, Houston, Tex.

Application February 7, 1947, Serial No. 727,167

5 Claims. (Cl. 251—98)

This invention relates to a balanced rotary valve assembly.

An object of the present invention is to provide an assembly of the character described wherein means have been provided for balancing the valve stem and valve between fluids under pressure to the end that the valve and valve stem may, at all times, be easily turned.

It is another object of the present invention to provide an assembly of the character described wherein there is provided a piston area on the valve stem and a chamber therearound with means for supplying fluid under pressure into the chamber and means for sealing the stem with the valve casing to prevent the escape of fluid from the chamber.

The invention also embodies novel means for lubricating the valve stem.

Other objects and advantages will be apparent from the following specification which is illustrated by the accompanying drawings wherein.

Figure 1:
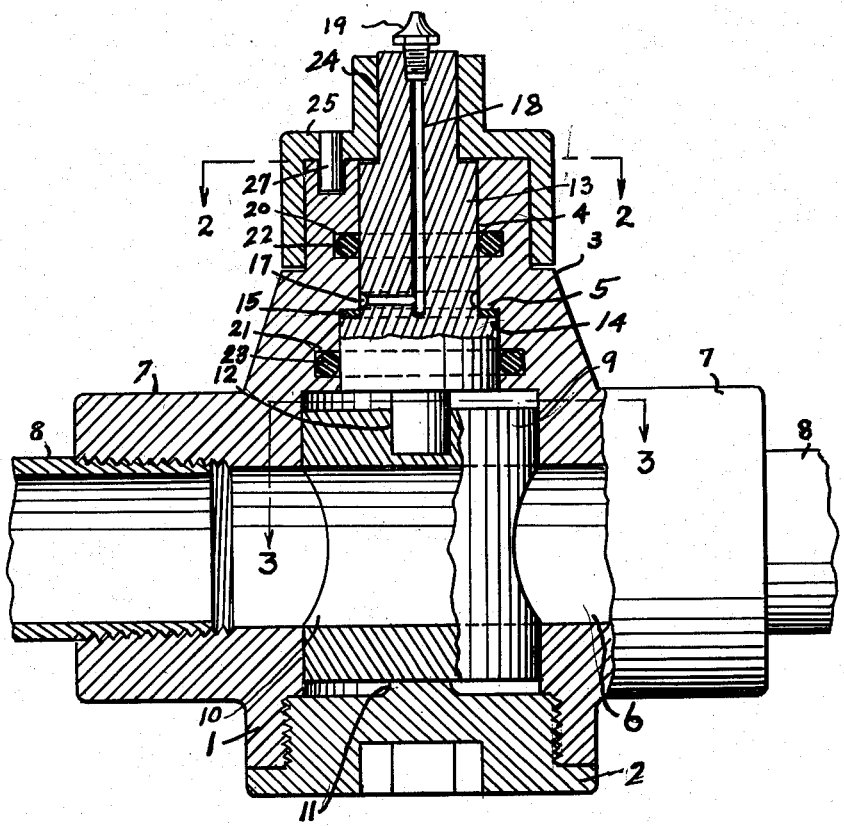
Figure 1 is a side elevation of the assembly, partly in section
Figure 2:
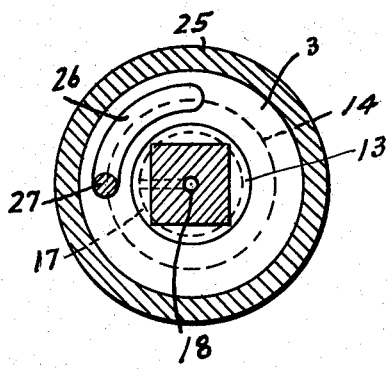
Figure 2 is a transverse, sectional view taken on the line 2—2 of Figure 1.
Figure 3:
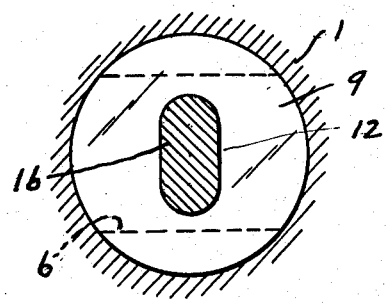
Figure 3 is a transverse, sectional view taken on the line 3—3 of Figure 1.

Referring now more particularly to the drawings, wherein like numerals of reference designate the same parts in each of the figures, the numeral 1 designates the valve casing or housing which is substantially cylindrical in form and one end of which may be closed by the removable plug 2.

The other end of the casing is extended forming a bonnet 3 which as shown is integral with the rest of the housing and is provided with an axial bearing 4 whose inner end is enlarged forming an inwardly facing annular shoulder 5 in the bonnet.

The casing is provided with a transverse flowway 6 therethrough providing an inlet and outlet to the hollow interior of the body thereof and surrounding this flowway is provided with tubular extensions 7, 7 into which adjacent sections 8, 8 of a flow line, may be screwed.

The inside of the body of the casing is hollow and of cylindrical contour and fitted within the casing there is a cylindrical valve or valve core 9 having a passageway 10 therethrough. The valve may be turned to bring said passageway into and out of alignment with the flowway 6.

The inner end of the plug 2 is formed with a boss 11 against which one end of the valve abuts and the other end of the valve is provided with an oblong recess 12.

Fitted in the bearing 4 there is a valve stem 13. Its inner end is enlarged in diameter to form an external annular shoulder 14 opposite the shoulder 5 of the bonnet. Between these shoulders there is a washer 15 forming a wear ring around the stem. The extreme inner end of the stem is reduced and of oblong shape forming an extension 16 which fits into the recess 12 and whose end abuts the bottom of said recess.

Outwardly of the shoulder 5 the stem 13 is provided with an external, annular groove 17.

Leading from the outer end of the stem there is an axial duct 18 whose inner end is turned outwardly through the stem and enters the groove 17.

The outer end of the duct 18 is closed by a check valve 19 through which a lubricant may be forced, under pressure, into the groove 17 but which prevents the escape of said fluid.

On opposite sides of the groove 17 the bonnet is provided with internal annular grooves 20, 21 in which O-rings 22, 23 are seated, said O-rings forming seals with the stem 13 to prevent escape of the fluid, under pressure, that flows out from the groove 17, along the axis of the stem.

The outer end of the stem 13 extends beyond the bonnet and is formed square in cross-section and fitted over this extended end of the stem and keyed thereto by the transverse key 24 there is a hood 25 whose inner end is enlarged and fitted closely over the outer end of the bonnet 3.

The outer end of the bonnet has a deep arcuate groove 26 and a pin 27 is anchored to the hood and extends into the groove 26 and limits the turning movement of the stem and valve to a quarter turn so that the valve may be opened and closed.

The valve 9 will be, at all times, under pressure of the fluid in the line 8 and the pressure of the fluid in the fluid-tight chamber formed around the stem between the O rings and enclosed thereby may be built up to approximately the same pressure as that of the fluid flowing through the line so that the pressure in said chamber against the piston area on the valve stem constituted by shoulder 14 will counterbalance the line pressure so that the valve and stem may at all times be easily turned; otherwise the friction of adjacent parts would make it very difficult to turn the valve and stem and also would subject said adjacent parts to severe wear.

It is to be noted that the area of the lower end of the valve stem exposed to line pressure is larger than the area of the shoulder 14 exposed to pressure in the chamber around the valve stem. Therefore in order to avoid metal to metal contact of the shoulder 14, wear ring 15, and shoulder 5, it is necessary that the pressure in the stem chamber be greater than that in the line. As is well known O ring seals are more effective with the usual liquid and solid lubricants such as oil and grease than with gaseous lubricants such as air. However regardless of the lubricant used, as long as the seals are effective the valve stem will slide axially up and down until the piston area of the shoulder around the valve stem multiplied by the pressure in the chamber around the stem equals the line pressure multiplied by the area of the lower end of the stem exposed thereto. In the case of substantially incompressible lubricants the distance of travel will be slight at first and thereafter will be proportional to the amount of leakage. If at any time the line pressure finally forces the stem and bonnet shoulders into metallic contact with the wear ring, additional lubricant can be added to the stem chamber. If so much lubricant should be added that the line pressure is overcome, the stem will push the valve down against the boss 11. This will be the condition when the valve is first placed in service before the line fluid has leaked around the valve into the casing. Ultimately, however, the line pressure will predominate due to leakage so that the valve stem will lift and become balanced as above described and if desired the process can be hastened by bleeding lubricant from the stem chamber. The valve 9 then, being separate from the stem, will have equal upper and lower projected areas perpendicular to the stem axis exposed to line pressure and hence will also be balanced with respect thereto. Due to the balance of axial pressures and the lubricant cushion between stem and bonnet, the members can be easily turned.

The drawings and description are illustrative merely while the broad principle of the invention will be defined by the appended claims.

What I claim is:

1. A valve assembly comprising, a valve casing having a flowway therethrough, a valve turnable in the casing and having a passageway therethrough movable into and out of registration with the flowway, a stem bearing in the casing whose inner end is enlarged forming an inside annular shoulder, a stem fitted in said bearing and having an external annular shoulder, a wear ring between said shoulders, said assembly having an annular chamber around the valve stem encompassing said shoulders and the wear ring and also having a duct leading into said chamber for the admission of fluid under pressure into the chamber and annular seals between the stem and casing on opposite sides of the chamber.

2. A valve assembly comprising, a valve casing one end of which is closed and the other end of which is extended forming a tubular bonnet provided with an axial bearing whose inner end is enlarged forming an inwardly facing annular shoulder in the bonnet, said casing having a transverse flowway therethrough, a cylindrical valve fitted into the casing having a passageway therethrough, said valve being turnable to bring the passageway into and out of alignment with the flowway, a valve stem fitted into the bearing whose inner end is enlarged to form an external annular shoulder opposite the shoulder in the bonnet, a washer around the stem between the shoulders forming a wear ring, means operatively connecting the inner end of the stem with the valve whereby the valve may be turned by the stem, said stem having an external annular groove outwardly of the shoulder thereon, said stem having a duct leading into the groove through which a lubricant may be forced into the groove, said bonnet having internal annular grooves respectively outwardly of the groove in the stem and inwardly of the shoulder on the stem and seal rings in the bonnet grooves forming seals with the stem.

3. A valve assembly comprising a valve casing having a flowway therethrough, a valve turnable in the casing and having a passageway therethrough movable into and out of registration with the flowway, a stem bearing in the casing whose inner end is enlarged forming an inside annular shoulder, a stem fitted in said bearing and having an external annular shoulder, said assembly having an annular fluid-tight chamber around the valve stem encompassing the shoulders and also having a duct leading into said chamber for the admission of fluid under pressure into the chamber and annular seals between the stem and casing on opposite sides of the chamber, and a check valve in said duct preventing outflow from said chamber.

4. A valve assembly comprising a valve casing having a flowway therethrough, a valve turnable in the casing and having a passageway therethrough movable into and out of registration with the flowway, a stem opening in the casing whose inner end is enlarged forming an inside annular shoulder, a stem extending through said opening and having an external annular shoulder, means connecting said stem and casing to limit inward axial movement of said stem, said shoulders being spaced apart when said stem is at its limit of inward axial movement, said stem being separate from said valve, means to connect said stem and valve for rotary movement but allowing relative axial movement thereof, means independent of the axial position of said stem to seal between said stem and casing on opposite sides of said shoulders, said assembly having an annular fluid-tight chamber around the valve stem encompassing the shoulders and also having a duct leading into said chamber for the admission of fluid under pressure into the chamber and a check valve in said duct preventing outflow from said chamber, said chamber including walls of said casing opening and said sealing means.

5. A valve assembly comprising a valve casing having a flow passage therethrough, a valve movable in the casing between a position in which it blocks the passage through the casing and a position in which the passage through the casing is clear, a valve stem opening in the casing, a valve stem extending into said casing through said opening to move said valve, means including walls on said casing forming a fluid-tight chamber around a portion of said valve stem, the last said means also including means axially spaced along said stem portion to seal between said walls and said stem portion to prevent the escape of pressure fluid from said chamber, means leading into said chamber from outside the valve assembly to admit fluid under pressure into said chamber, said stem portion between said seals having an area facing away from the inner end of said stem which when projected onto a plane perpendicular to the stem is larger than the similarly projected area of that portion of said stem between said seals which prior to projection faces toward the inner end of the stem, said chamber having an area facing toward the inner end of said stem which when projected onto a plane perpendicular to the stem is larger than the similarly projected area of said chamber which prior to projection faces away from the inner end of said stem.

JACK HESS.

REFERENCES CITED

The following references are of record in the file of this patent:

UNITED STATES PATENTS

| Number | Name | Date |
| --- | --- | --- |
| 1,571,992 | Bayles | Feb. 9, 1926 |
| 1,791,914 | Tomlinson | Feb. 10, 1931 |
| 1,861,747 | Martin | June 7, 1932 |
| 1,966,807 | Sweet | July 17, 1934 |
| 2,066,250 | Clark | Dec. 29, 1936 |
| 2,115,383 | Christensen | Apr. 2, 1938 |
| 2,124,359 | Weisgerber | July 19, 1938 |
| 2,206,370 | Scherer | July 2, 1940 |
| 2,300,835 | Volpin | Nov. 3, 1942 |
| 2,493,966 | Hartly | Jan. 10, 1950 |